Dec. 9, 1947.  G. G. SMITH  2,432,346
SYNCHRONOUS TIMER
Filed March 30, 1946
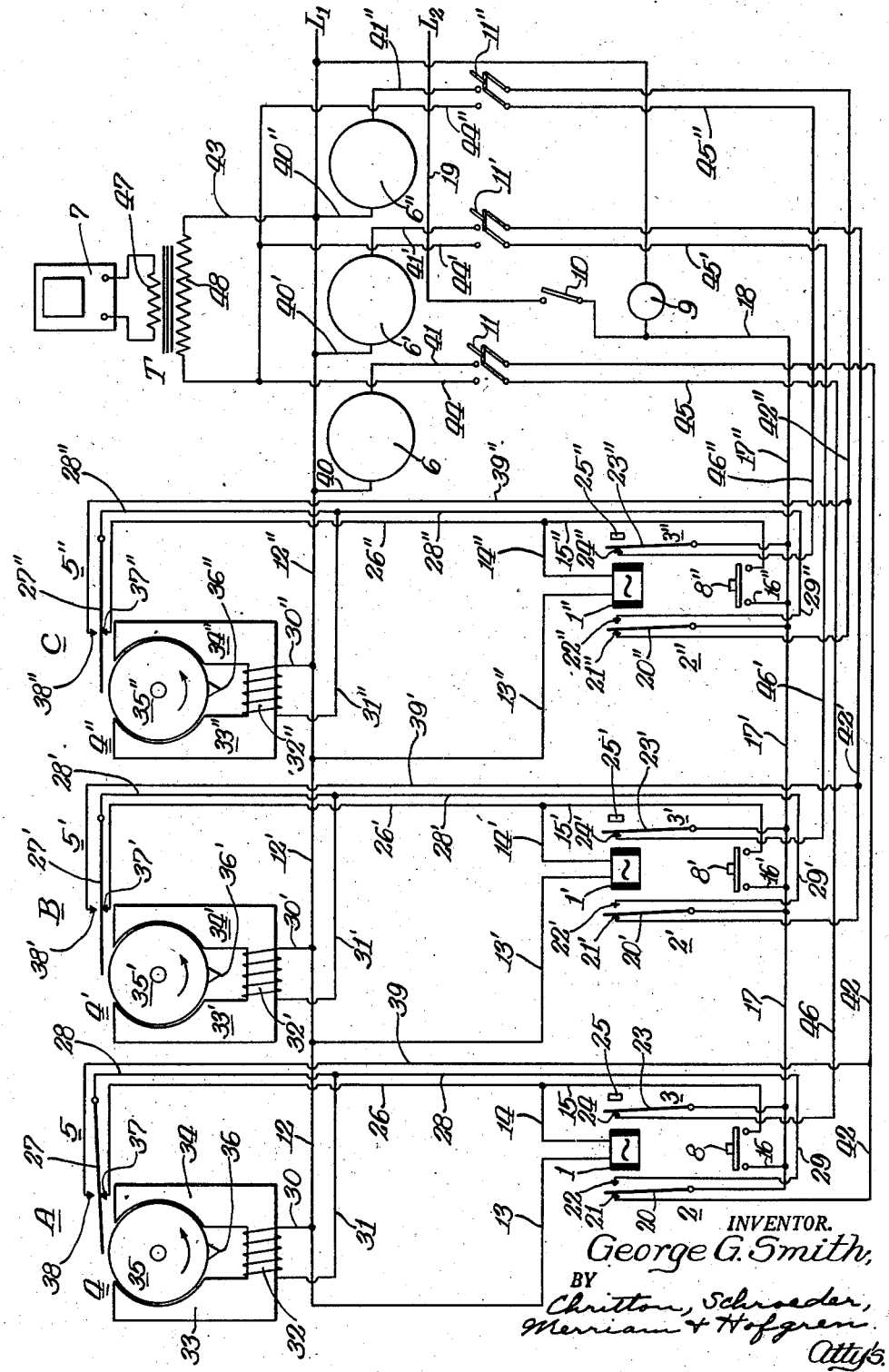
INVENTOR.
George G. Smith,
BY
Chritton, Schroeder,
Merriam & Hofgren
Attys.

Patented Dec. 9, 1947

2,432,346

UNITED STATES PATENT OFFICE 2,432,346

SYNCHRONOUS TIMER

George G. Smith, Elgin, Ill.

Application March 30, 1946, Serial No. 658,418

4 Claims. (Cl. 161—1.5)

This invention relates to a synchronous timer, and while not limited thereto it is especially adapted for use as a synchronous dairy timer for giving a controlled milking interval for machine-milked dairy herds.

By the present invention, the ever increasing demand for short-cycle milking as advocated by the agricultural extension divisions of leading State universities is made possible. Audible and visual signals are simultaneously operated by a timer mechanism, and eliminate the possibility of irregular milking periods as exist under the methods in use prior to my invention. Herds milked under my novel system soon become accustomed to the time allotted, with the result of increased production and a corresponding overall saving of time. With the use of the present invention, it has been found that in all instances, manpower and milking equipment can be reduced and, at the same time, a decided increase in production obtained.

Among the objects of my invention are: to provide a novel and improved synchronous timer; to provide a novel synchronous dairy timer; to provide a synchronous dairy timer in which the timing is accomplished by the use of electrically-operated control relays and synchronous timers made up in units to handle the number of milking machines required for milking the herd in question; to provide a device for decreasing the time of the milking cycle, and eliminate the possibility of irregular milking periods; to provide a device of the character referred to in which a synchronous motor is used for controlling the time of the timing apparatus and which when the timing interval has elapsed causes an audible and a visible signal to be plainly given; to provide a battery of units connected in electrical circuits so that a plurality of cows may be milked at the same or different periods as desired; and such further objects, advantages and capabilities, inherently possessed by my invention, as will later more fully appear.

My invention further resides in the combination, construction and arrangement of parts illustrated in the accompanying drawing, and while I have shown therein a preferred embodiment, I wish it understood that the same is susceptible of modification and change without departing from the spirit of my invention.

In the drawing the single view shows diagrammatically the various parts and circuits of a synchronous timer embodying my invention.

While not limited thereto, my invention is particularly adapted for use as a synchronous dairy timer, and I am, for illustrative purposes, so describing it, but wish it understood that it may be used in such other connections and for such other purposes to which it may be adapted. As shown in the drawing, my improved timer comprises generally a relay 1 having a pair of two-way switches 2 and 3, a synchronous motor 4 having a two-way switch 5, a visible signal including a light 6, an audible signal including a buzzer or the like 7, a momentary switch 8, a pilot light 9, a main circuit switch 10, a double-pole single-throw switch 11, and circuits connecting said parts as later more fully explained. For convenience I have shown my timer as including three similar units A, B and C for timing the milking interval or cycle of three milking machines which may be applied to the respective cows and operated simultaneously or in delayed sequence as desired. It will be understood, however, that a greater or less number of such units may be used to time the milking cycle of the milking machines on a greater or less number of cows as may be desired.

As the three units A, B and C are the same in construction and operation, I will, for convenience, only describe the construction and operation of unit A in detail, and indicate similar parts in unit B by similar reference numerals with an exponent 1 (or prime), and similar parts in unit C by similar reference numerals with a double prime. Each of the three units are connected by suitable circuits to a main circuit having the lead wires $L_1$ and $L_2$ incorporated in a plug adapted to be inserted into a wall socket or other suitable source of 110 volt A. C. electrical current. After plugging the plug into the power outlet the single-pole toggle switch 10 is closed, which energizes the circuit, lighting the small pilot light 9, thus showing that the current is complete. After placing the milking machine on the cow, the momentary switch button 8 of unit A is depressed. This energizes the holding coil of the relay 1 through the circuit $L_1$, 12—19 and $L_2$.

Energization of this holding coil immediately moves the movable member 20 of the two-way switch 2 away from contact 21 and into contact with contact 22, and at the same time moves the movable member 23 of the two-way switch 3 away from contact 24 and into contact with the stop 25. The movable members 20 and 23 are spring urged to normally engage contacts 21 and 24 when the relay holding coil is de-energized. For convenience of understanding, the two-way switch 3 has been shown on the right hand side of the relay coil, whereas it should be on the left hand side for the operations described, but it will be understood that it is in fact positioned on the left hand side, but to so place it in the drawing could confuse the lines. The main requirement is that the two-way switches 2 and 3 operate as described above. It will hence be assumed that the switch 3 is on the left hand side of the coil but in the same arrangement of switch parts as shown.

Momentary switch 8 is only held closed for an instant by the operator's finger, and when released is spring pressed to open position, but this instant is sufficient to energize the relay coil and move movable fingers 20 and 23 into engagement with contact 22 and stop 25 and break contact with contacts 21 and 24. Momentary switch 8 now being open, the current will flow from wire 14 through wire 26, movable member 27 of the two-way switch 5, wires 28 and 29, movable member 20, and wires 17—19 and $L_2$. It will also be noted that wire 30—31 has a live connection with both of wires 12 and 28 and coils around the portion 32 of the field magnets 33 and 34 of the synchronous motor 4. This energizes the motor which starts the timing interval.

By snapping the double-pole single-throw toggle switch 11 closed, after the momentary switch 8 has been pushed closed, the indicator light 6 and the buzzer 7 are cut into the circuit, but they will not yet be energized because the movable members 20 and 23 of the two-way switches 2 and 3 are moved away (by the relay coil) from contacts 21 and 24, thus breaking these circuits to the light and buzzer. Connected by any suitable conventional speed reducing mechanism to the armature of the motor 4 is a member 35 reduced in speed to such an extent that one revolution of member 35 will substantially be the time allotted to the milking interval of the milking machine being timed by unit A. Member 35 is provided on its outer margin with a finger 36 which when it wipes over movable member 27 of two-way switch 5, will throw member 27 away from contact 37 and into engagement with contact 38. As will be understood, the circumferential speed of wiping finger 36 may be varied by conventional speed reducing connection to the motor armature as desired. Hence a longer or shorter milking interval can be allotted as desired.

When the wiping finger 36 has moved nearly to the end of the timing interval, it will contact movable member 27 and throw it away from its spring urged engagement with contact 37 and into engagement with contact 38. This immediately breaks the circuit through wire 26 and de-energizes the relay coil with the result that movable members 20 and 23 of the two-way switches 2 and 3 will be spring urged back into engagement with contacts 21 and 24 respectively. This energizes the light 6 and buzzer 7 and causes these signals to become apparent. The current for the light 6 will follow the closed circuit $L_1$, 40, 41, switch 11 (which had previously been closed), 42, contact 21, movable arm 20, 17, 18, switch 10 (which is now closed), 19 and $L_2$. The current for the buzzer 7 will follow the closed circuit $L_1$, 43, 44, switch 11, 45, 46, contact 24, movable arm 23, 17, 18, switch 10, 19 and $L_2$.

After the wiping arm 36 has moved movable member 27 away from engagement with contact 37 and into engagement with contact 38, it is desirable that the motor continue to run until this wiping arm has cleared the free end of movable member 27 so as to position the parts to be ready to start a new cycle upon pushing momentary switch 8 closed. This is made possible by forming a permanent live connection between wires 31 and 28, as a result of which, even though no current flows through contact 37, current will flow through the motor field magnet coil through the circuit $L_1$, 12, 30, 31, 28, movable member 27, contact 38, 39, 42, contact 21, movable member 20, 17, 18, switch 10, 19 and $L_2$. The motor thus continues until wiping arm 36 clears the free end of movable member 27 whereupon the latter under spring action snaps back into engagement with contact 37 and the motor stops because its circuit is broken. About one second is consumed in the take-over just described, and the circuit is then set up for a repeat operation.

The buzzer 7 is a common buzzer for all of the units A, B and C, and an audible signal will be heard with any combination of indicator lights. This is accomplished by using a common buzzer across the 8-volt secondary 47 of the transformer T, while the switching circuit controls the 110 volt primary 48. The operations of units B and C (or additional units if desired) in gang are the same as described for unit A, and may be cut in or out of the circuit by manipulating the double-pole single-throw toggle switches 11' and 11''.

From the above the operation of the three-unit timer will be seen to be as follows:

1. The unit is plugged into any 110 volt A. C. light or power outlet.

2. Snapping the single-pole toggle switch 10 closed, energizes the circuit, lighting a small pilot light 9 showing that the current is complete.

3. After placing the milking machine on the cow, the momentary switch button 8 is depressed. This energizes the holding coil 1 of the relay, which in turn energizes the synchronous motor 4, which starts the timing interval.

4. By snapping the double-pole single-throw toggle switch 11 closed, the indicator light 6 and buzzer 7 are cut into the circuit, and upon completion of the timing interval, a visual signal will appear, accompanied by an audible signal, which will continue until the milker is removed and placed in operation on the next cow to be milked, at which time the momentary control button 8 is again depressed and a new cycle is started.

5. The holding coil of the relay 1, upon being energized by the momentary contact of control button 8 is automatically interlocked into the circuit through the closed contacts 20 and 22 and the broken contacts 23 and 24.

6. When the timing interval is completed, the normally closed contacts 27 and 37 are opened by the wiping finger of the synchronous motor, which opens the circuit to the holding coil of the relay and completes the circuit to the indicator light and buzzer through the now closed contacts 20 and 21 of switch 2 and 23 and 24 of switch 3, at the same time transferring the synchronous motor current source through the normally open contacts 27 and 38 of the synchronous motor which were closed by the wiping finger. This furnishes energy to the motor, which continues until the wiping finger clears the movable member 27 and its contacts return to normally-closed position. At this time, the synchronous motor comes to rest and the circuit is set up for a further similar operation.

I claim:

1. In timing apparatus, a motor, a relay having a switch, a relay switch, a motor-operated switch, a momentary initiating switch, a signal, a circuit adapted to be connected with a source of electrical current and connecting said parts, means to de-energize the signal when the initiating switch is closed, means to automatically energize the signal when the motor-operated switch is operated by the motor, the closing of the initiating switch energizing the motor and the relay, and the opening of the motor-operated switch de-energizing the relay without de-energizing the motor.

2. In timing apparatus, a motor, a relay having a switch, a relay switch, a motor-operated switch, a momentary initiating switch, a signal, a circuit adapted to be connected with a source of electrical current and connecting said parts, means to de-energize the signal when the initiating switch is closed, means to automatically energize the signal when the motor-operated switch is operated by the motor, the closing of the initiating switch energizing the motor and the relay, and the opening of the motor-operated switch de-energizing the relay without de-energizing the motor, and means to de-energize and stop the motor shortly after the opening of the motor-operated switch without de-energizing the signal.

3. In timing apparatus, a motor, a relay having a switch, a relay switch, a motor-operated switch, a momentary initiating switch, a signal, a circuit adapted to be connected with a source of electrical current and connecting said parts, means to de-energize the signal when the initiating switch is closed, means to automatically energize the signal when the motor-operated switch is operated by the motor, the closing of the initiating switch energizing the motor and the relay, and the opening of the motor-operated switch de-energizing the relay without de-energizing the motor, means to de-energize and stop the motor shortly after the opening of the motor-operated switch without de-energizing the signal, said signal being a visible signal, a second relay switch, an audible signal, and means to de-energize and energize the audible signal simultaneously with the de-energizing and energizing of the visible signal.

4. In timing apparatus, a motor, an electrically operated control relay having a two-way switch, a motor-operated two-way switch, a momentary switch, a signal device, and an electrical circuit connected with a source of supply of electrical current and connecting said parts, a first contact of the relay switch being connected with the signal device, a second contact of the relay switch being connected with the movable part of the motor-operated switch, a first contact of the motor-operated switch being connected with the relay circuit and the momentary switch, and a second contact of the motor-operated switch being connected with the signal device, whereby when the momentary switch is closed the relay will be energized, the motor started, the relay switch moved to break the circuit to the signal and connect the circuit to the movable part of the motor-operated switch which normally contacts its said first contact, means operated by the motor armature which when the armature has rotated a certain predetermined amount will move the movable part of the motor operated switch into contact with its said second contact to de-energize the relay and energize the signal, and a circuit connected with the circuit from the said second contact of the relay switch to the movable part of the motor-operated switch and through the field magnet of the motor back to the main circuit whereby when the movable part of the motor-operated switch contacts its said second contact the motor will continue to be energized until the movable part of the motor-operated switch moves away from its said second contact.

GEORGE G. SMITH.

REFERENCES CITED

The following references are of record in the file of this patent:

UNITED STATES PATENTS

| Number | Name | Date |
|---|---|---|
| 1,475,715 | Oswald | Nov. 27, 1923 |
| 2,223,207 | Ellis | Nov. 26, 1940 |
| 2,269,973 | Hathaway | Jan. 13, 1942 |